(12) United States Patent
Yanagawa et al.

(10) Patent No.: US 8,014,256 B2
(45) Date of Patent: Sep. 6, 2011

(54) OPTICAL PICKUP AND INFORMATION DEVICE

(75) Inventors: Naoharu Yanagawa, Saitama (JP); Masataka Izawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 344 days.

(21) Appl. No.: 12/295,049

(22) PCT Filed: Mar. 29, 2007

(86) PCT No.: PCT/JP2007/056925
§ 371 (c)(1),
(2), (4) Date: Dec. 29, 2008

(87) PCT Pub. No.: WO2007/114278
PCT Pub. Date: Oct. 11, 2007

(65) Prior Publication Data
US 2009/0323501 A1    Dec. 31, 2009

(30) Foreign Application Priority Data
Mar. 30, 2006  (JP) .................................. 2006-095362

(51) Int. Cl.
*G11B 7/00*    (2006.01)
(52) U.S. Cl. ................. 369/112.03; 369/44.37
(58) Field of Classification Search ............ 369/112.03, 369/44.37
See application file for complete search history.

(56) References Cited

U.S. PATENT DOCUMENTS

| | | | | |
|---|---|---|---|---|
| 4,888,757 | A | * | 12/1989 | Fujita ........................ 369/44.37 |
| 7,009,929 | B2 | * | 3/2006 | Motegi ..................... 369/112.16 |
| 7,106,771 | B2 | * | 9/2006 | Shinohara et al. ........ 372/43.01 |
| 7,215,609 | B2 | * | 5/2007 | Shimano et al. .......... 369/44.37 |
| 2008/0239891 | A1 | * | 10/2008 | Ogata ........................ 369/44.25 |

FOREIGN PATENT DOCUMENTS

| | | |
|---|---|---|
| JP | 9-147408 | 6/1997 |
| JP | 10-27347 | 1/1998 |
| JP | 2005-44513 | 2/2005 |
| JP | 2005-063595 | 3/2005 |
| JP | 2005-203090 | 7/2005 |
| JP | 2005-228436 | 8/2005 |
| JP | 2005-346882 | 12/2005 |
| JP | 2006-344344 | 12/2006 |

OTHER PUBLICATIONS

International Search Report for PCT/JP2007/056925, mailed May 15, 2007.

* cited by examiner

*Primary Examiner* — Van N Chow
(74) *Attorney, Agent, or Firm* — Nixon & Vanderhye P.C.

(57) ABSTRACT

An optical pickup for irradiating an information recording medium, such as a DVD, with a laser beam when an information signal is recorded or reproduced, and information equipment provided with the optical pickup.

13 Claims, 9 Drawing Sheets

[FIG. 1]
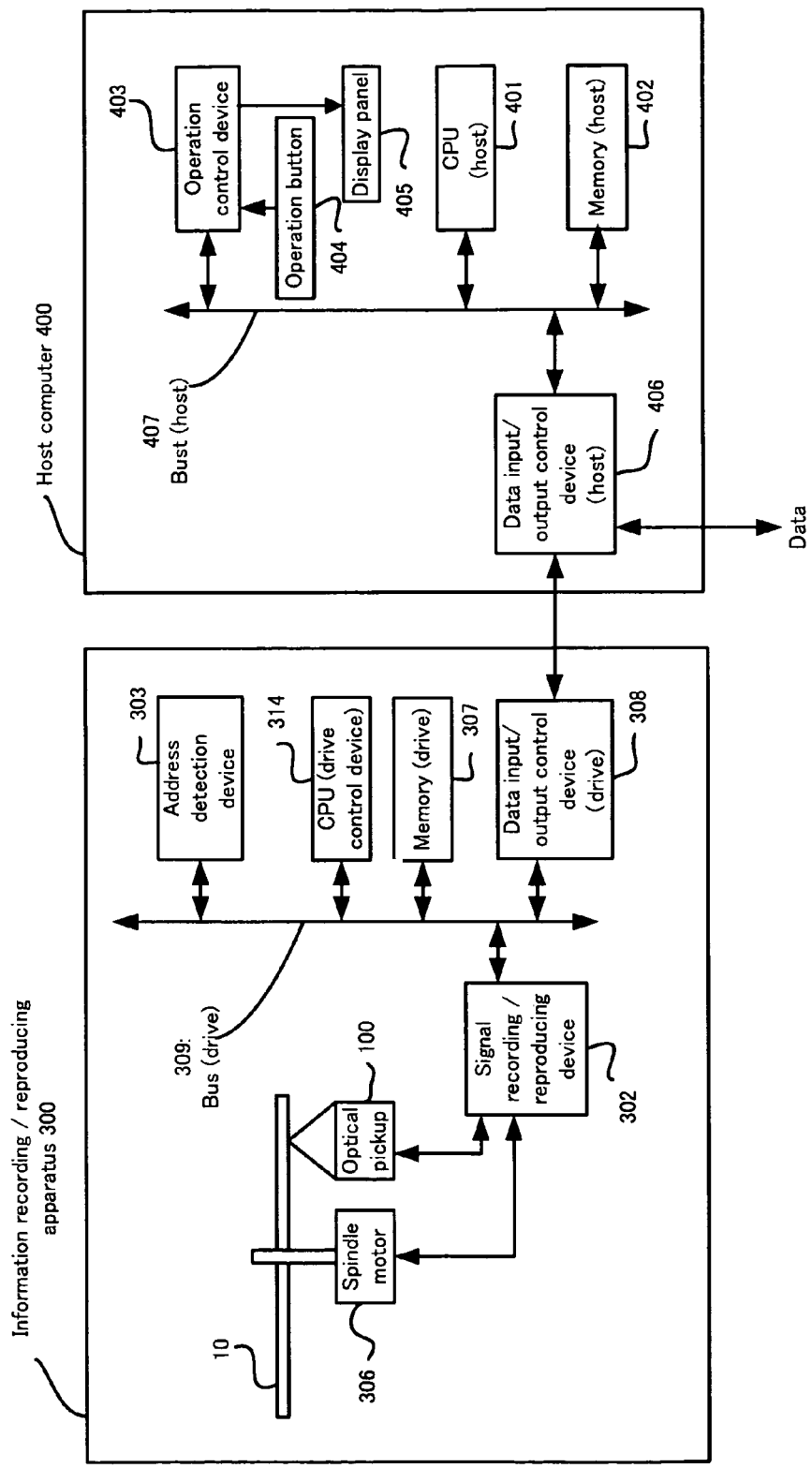

[FIG. 2]
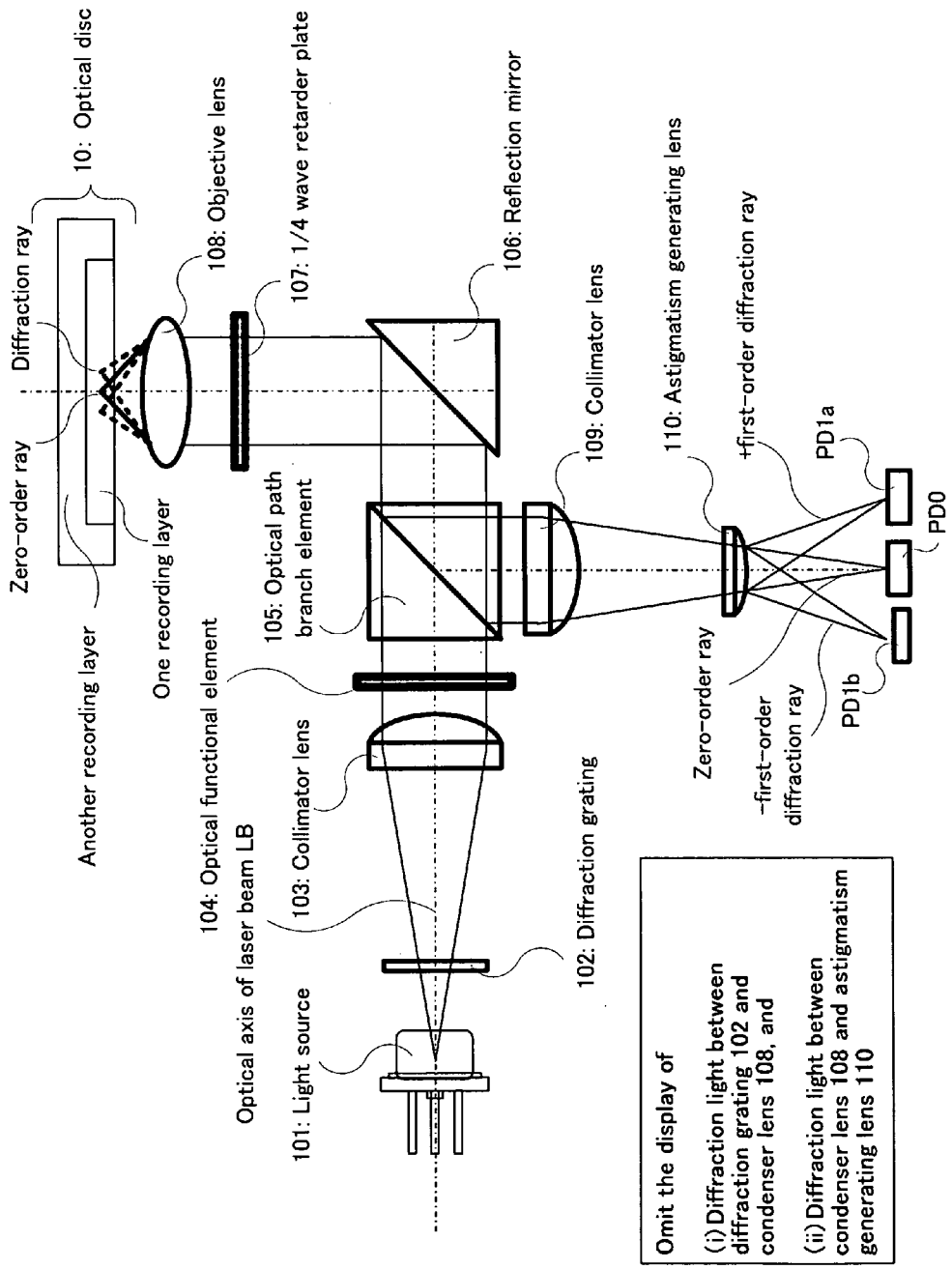

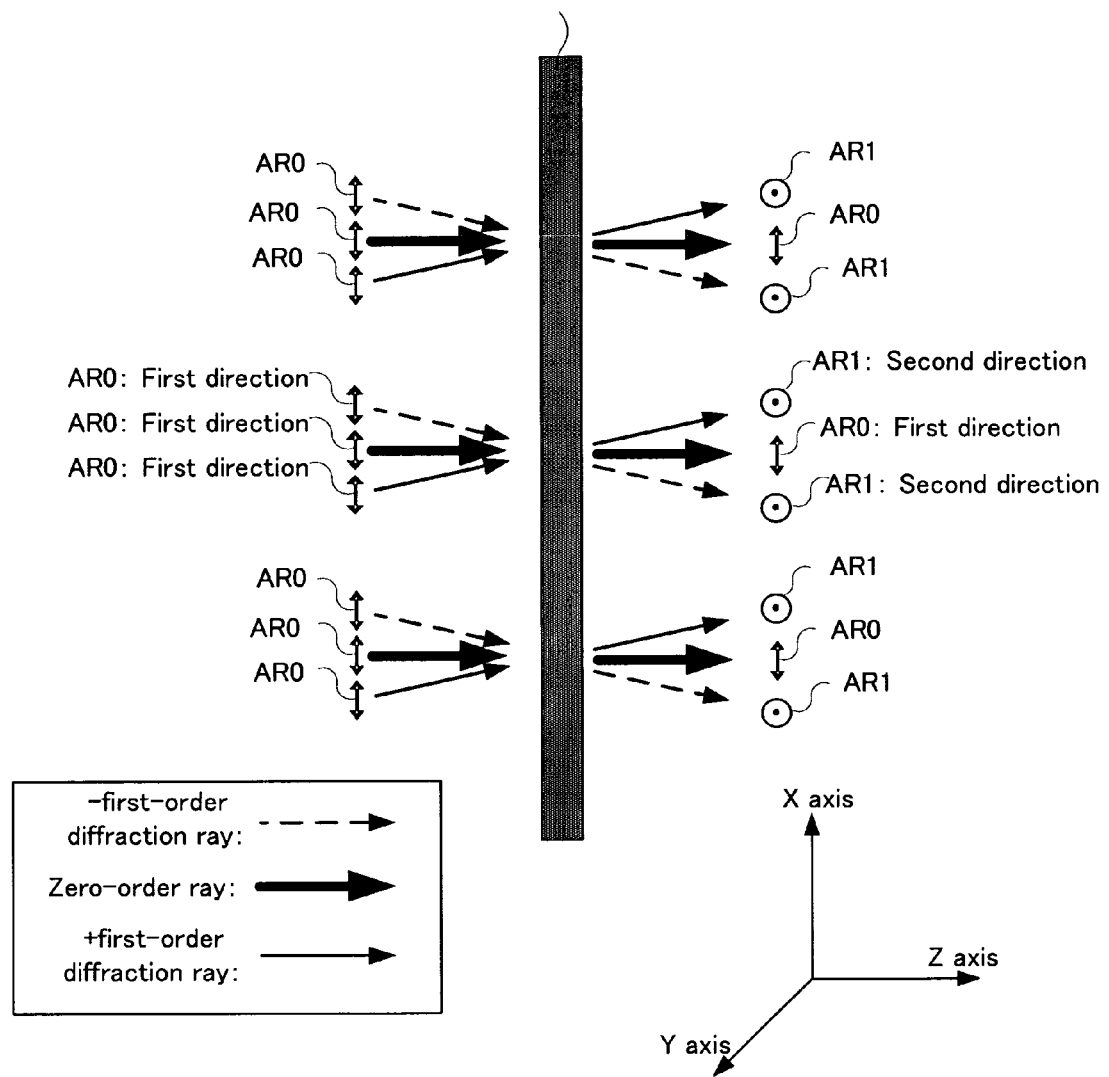
[FIG. 3]

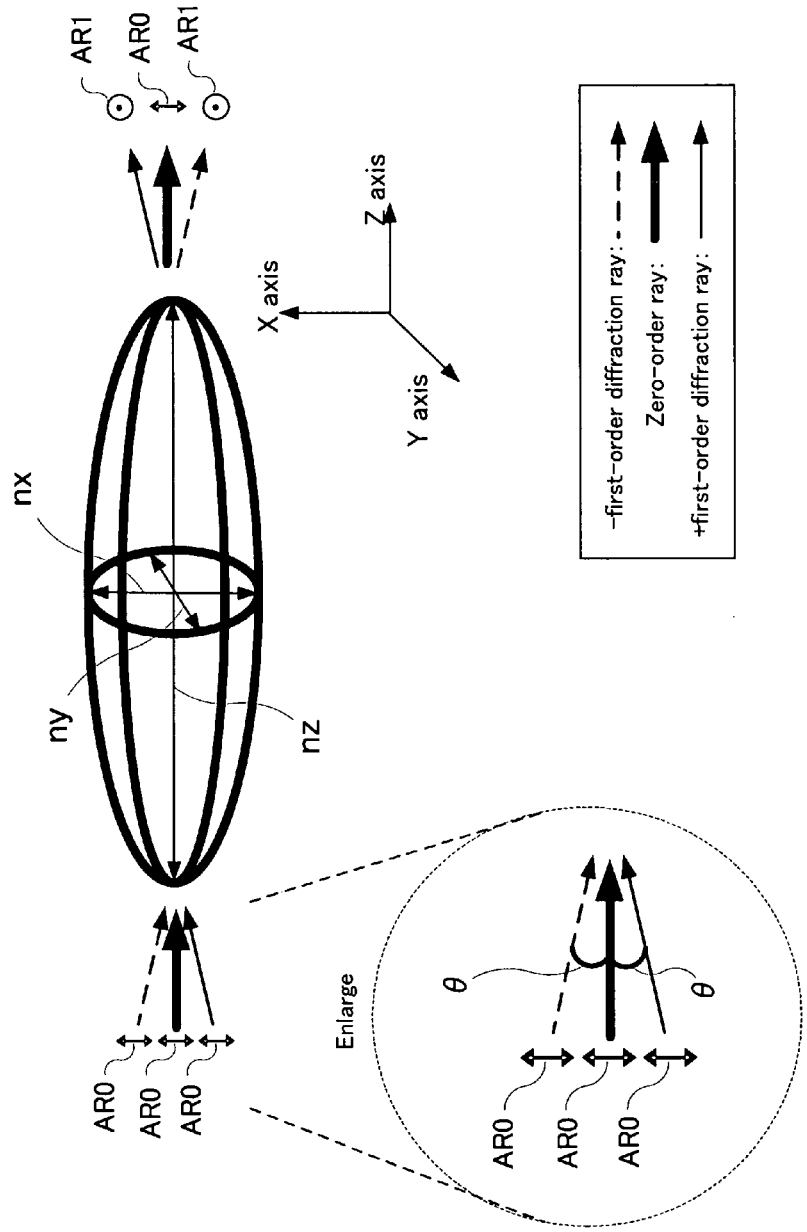
[FIG. 4]

[FIG. 5]
(a)
Optically isotropic
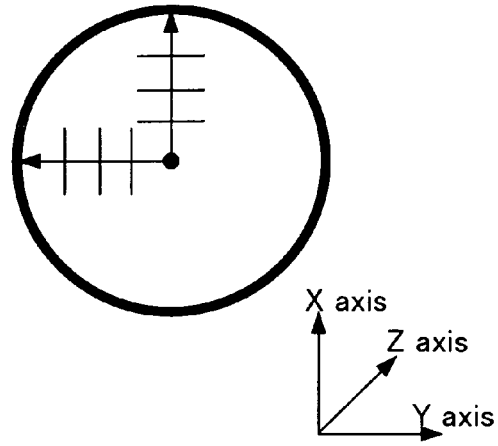
(b)
Optically anisotropic
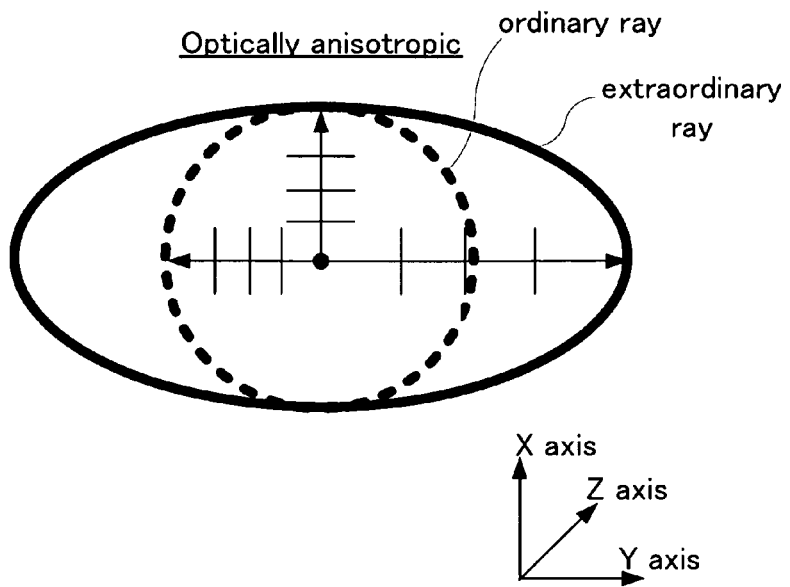

[FIG. 6]
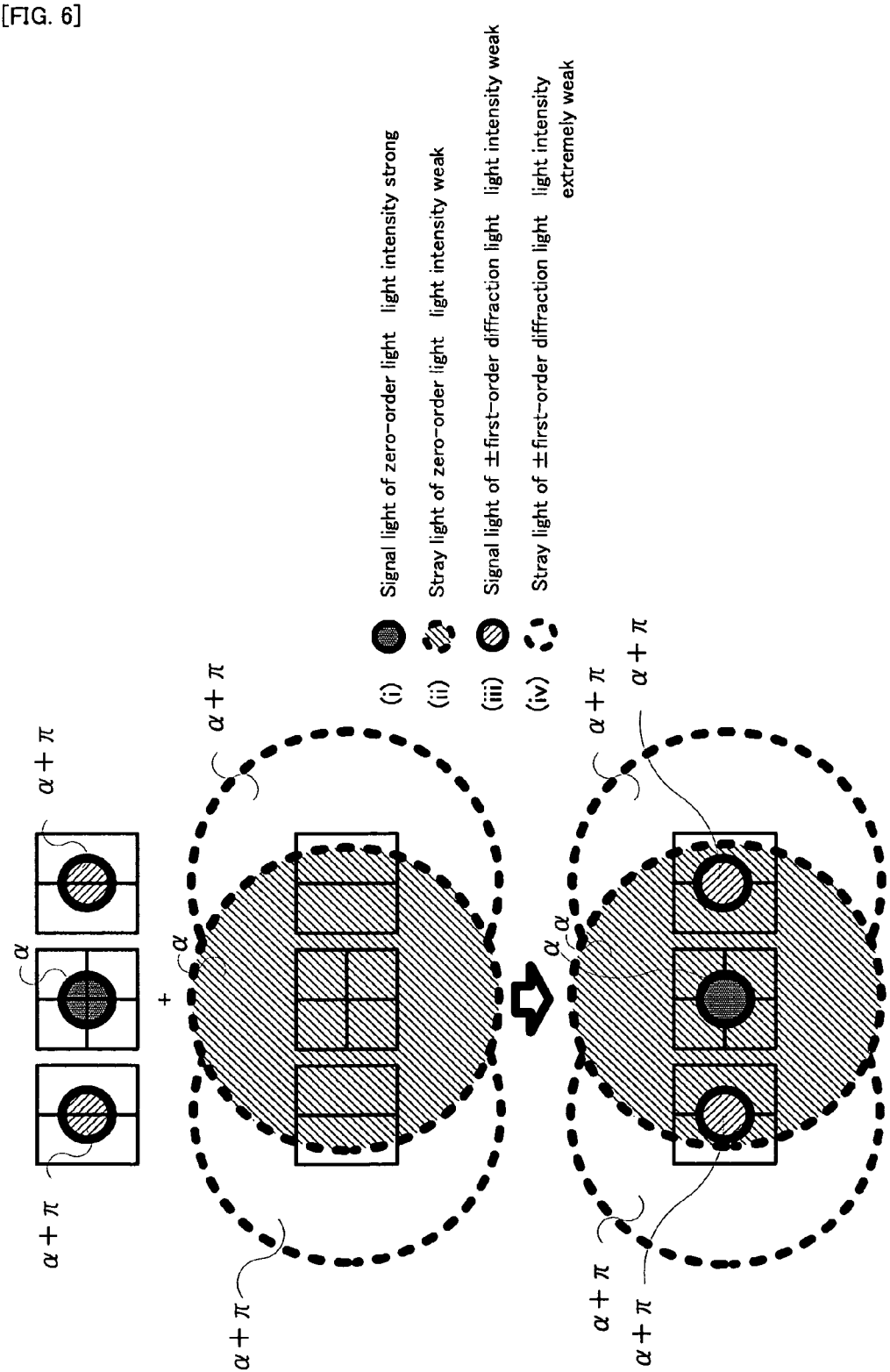

[FIG. 7]
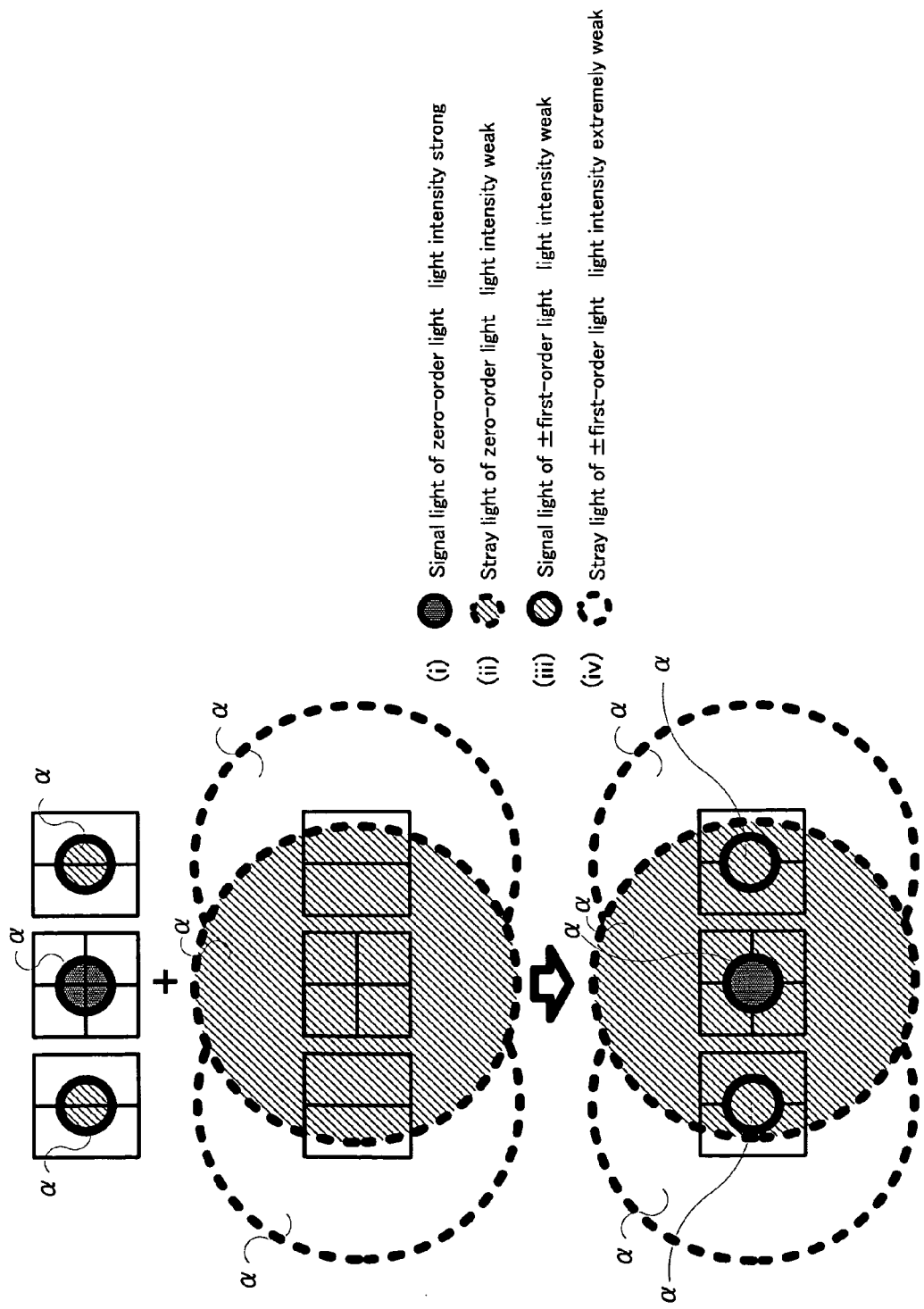

[FIG. 8]
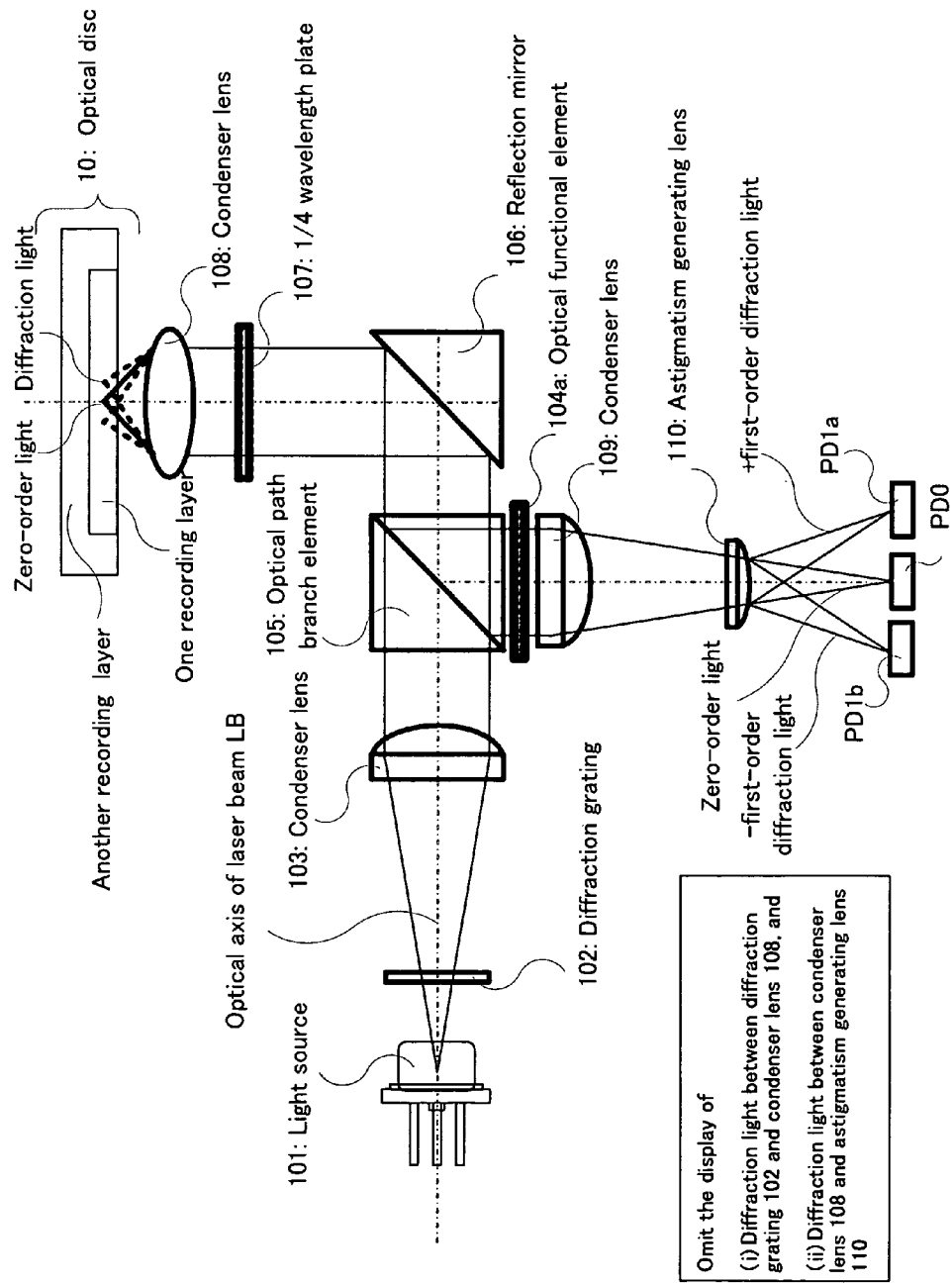

[FIG. 9]
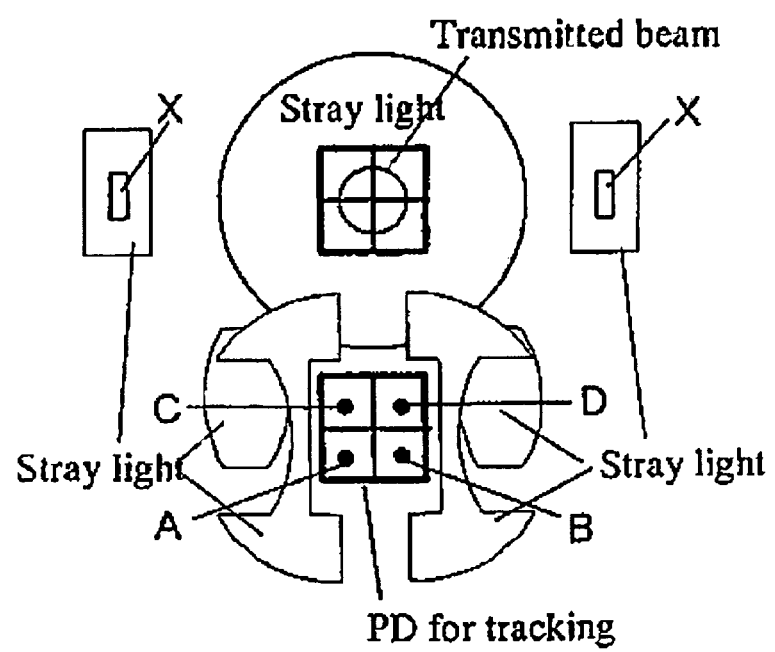

OPTICAL PICKUP AND INFORMATION DEVICE

This application is the U.S. national phase of International Application No. PCT/JP2007/056925, filed 29 Mar. 2007, which designated the U.S. and claims priority to JP Application No. 2006-095362, filed 30 Mar. 2006, the entire contents of each of which are hereby incorporated by reference.

TECHNICAL FIELD

The present invention relates to an optical pickup for irradiating an information recording medium, such as a DVD, with a laser beam when an information signal is recorded or reproduced, and information equipment provided with the optical pickup.

BACKGROUND ART

For example, there has been developed an information recording medium, such as a multilayer type optical disc, for optically recording or reproducing an information signal (data) using a laser beam or the like, such as a dual-layer type DVD, a dual-layer type Blu-ray, and a dual-layer type HD-DVD. In such a multilayer type optical disc, if the interval between recording layers is large, a signal from the selected recording layer possibly deteriorates due to an influence of spherical aberration, so that the interval between recording layers tends to be narrowed. However, if the interval between recording layers is narrowed, because of so-called interlayer crosstalk, return light from the multilayer type optical disc includes not only a component of reflected light (hereinafter referred to as "signal light" as occasion demands) generated in a selected desired recording layer (hereinafter referred to as "one recording layer" as occasion demands) but also a component of reflected light (hereinafter referred to "stray light" as occasion demands) generated in another recording layer other than the one recording layer, at high level. Thus, an S/N ratio of the signal component of a reproduction signal or the like is possibly reduced, which possibly makes it hard to properly perform various controls, such as tracking control. Specifically, in general, it is known that a signal component of the signal light and a component of stray light have a relationship of tradeoff on the multilayer type optical disc. That is, if a light receiving area of a light receiving device is reduced, it is possible to make the component of the stray light at a relatively low level and to reduce an influence of the stray light; however, at the same time, the signal component of the signal light also becomes at a relatively low level, and the S/N ratio is reduced, which makes it hard to properly perform the various controls, such as tracking control. On the other hand, if the light receiving area is increased, it is possible to make the signal component of the signal light at a relatively high level; however, at the same time, the component of the stray light also becomes at a relatively high level, and the S/N ratio is reduced, which makes it hard to properly perform the various controls, such as tracking control.

Thus, for example, in a tracking method in the recording or reproduction of the dual-layer type Blu-ray Disc, there has been suggested a technology of avoiding the stray light entering the light receiving element, by separating a push-pull signal from the signal light, using a hologram element. Alternatively, a patent document 1 discloses a technology of separating the reflected light from each recording layer, highly accurately, using a difference in angle of the optical axis of the return light returning from each recording layer of the dual-layer type optical disc.

Patent document 1: Japanese Patent Application Laid Open NO. 2005-228436

DISCLOSURE OF INVENTION

Subject To Be Solved By The Invention

However, in the various methods for reducing the influence of the stray light described above, as shown in FIG. 9, the stray light enters the light receiving element for receiving a focus error signal or RF signal (refer to overlap between "Stray light" and "Transmitted beam" in FIG. 9), so that there is such a technical problem that the S/N ratio of the signal component of the return light returning from the desired recording layer is reduced due to the influence of the stray light.

Alternatively, according to the patent document 1 described above or the like, there is such a technical problem that it is hard to manage or control various aberrations. Alternatively, there is such a technical problem that it is necessary to optimize the position of a Z-axis direction of a condenser lens for condensing the return light, or a light receiver, when the recording layer is changed.

In view or the aforementioned problems, it is therefore an object of the present invention to provide an optical pickup which can reproduce or record an information signal with higher accuracy, while reducing an influence of stray light, in an information recording medium, such as a multilayer type optical disc, and information equipment provided with such an optical pickup.

Means for Solving the Subject (Optical Pickup)

The above object of the present invention can be achieved by an optical pickup for recording or reproducing an information signal with respect to an optical disc provided with a plurality of recording layers, each recording layer having a recording track in which information pits are arranged, the information signal being recorded in the information pits, the optical pickup provided with: a light source for irradiating a laser beam; a diffracting device for diffracting the irradiated laser beam to zero-order light and diffraction light; an optical system for guiding the zero-order light and the diffraction light, which are diffracted, to one recording layer of the plurality of recording layers; an optical functional element for differentiating a phase difference of polarization of the zero-order light and a phase difference of polarization of the diffraction light; one or a plurality of light receiving devices for receiving at least the diffraction light; and an optical path branching device for guiding the zero-order light and the diffraction light coming from the one recording layer, to the light receiving device.

According to the optical pickup of the present invention, the laser beam irradiated from the light source is diffracted by the diffracting device, such as a diffraction grating, to the zero-order light (or zero-order ray) and the diffraction light (or diffraction ray). Then, by the optical system, such as an objective lens, a beam splitter, or a prism, it is guided to and focused on the one recording layer of the plurality of recording layers. At the same time, one return light generated in the one recording layer, is received by the light receiving device through the optical path branching device. Thus, the laser beam guided to and focused on the one recording layer, allows the information pits or marks formed in the one recording layer to be reproduced. Thus, it is possible to reproduce predetermined information from the optical disc. Alternatively, the focused laser beam allows the information pits or marks to be formed in the one recording layer. Thus, it is possible to record predetermined information onto the optical disc.

In particular, according to the present invention, the optical functional element can differentiate the phase difference of the polarization of the zero-order light and the phase difference of the polarization of the diffraction light, which are transmitted through the optical functional element. Here, the "phase difference of the polarization" in the present invention means a phase difference between two linear polarization components in which the polarization state of the laser beam can be defined, such as a linear polarization and elliptic polarization. Specifically, in general, the polarization of the laser beam can be decomposed into the two linear polarization components, which oscillate in directions crossing each other at a right angle in a plane perpendicular to the traveling direction of the light. Therefore, the polarization of the laser beam can be broadly classified into linear polarization, elliptic polarization, and circular polarization, on the basis of the amplitude and the phase difference of the two linear polarization components.

In other words, by virtue of the optical functional element, it is possible to differentiate the polarization state of the zero-order light and the polarization state of the diffraction light, which are transmitted through the optical functional element. Specifically, all the polarization state of the zero-order light and the polarization state of the diffraction light are a first state (e.g. linear polarization oscillating in a first direction) before they enter the optical functional element. On the other hand, after transmitted through the optical functional element, the polarization state of the zero-order light is the same first state as before entering. In contrast, after transmitted through the optical functional element, the polarization state of the diffraction light is different from before entering and is a second state (e.g linear polarization oscillating in a second direction). That is, it is possible to differentiate the polarization direction of the zero-order light and the polarization direction of the diffraction light, by crossing them each other at a right angle. Therefore, it is possible to effectively reduce the influence of the light interference between the stray light of the zero-order light and the signal light of the diffraction light. In particular, since the stray light of the zero-order light and the signal light of the diffraction light have substantially the same level of the light intensity, it is possible to more significantly reduce the influence of the light interference by the stray light on the light receiving device which receives the diffraction light, by differentiating the polarization directions. In addition, even in the signal light of the zero-order light and the stray light of the diffraction light, it is possible to reduce the influence of the light interference by the stray light on the light receiving device which receives the zero-order light, by differentiating the polarization directions.

As a result, it is possible to make the light receiving device receive the light, under the condition that the influence of the stray light is effectively reduced and the level of the light intensity is maintained to be higher, for example, in the tracking control based on a three-beam method on the multilayer type information recording medium, to thereby achieve the highly-accurate tracking control.

In one aspect of the optical pickup of the present invention, the optical functional element is disposed (i) on an optical path between the light source and the optical path branching device, or (ii) on an optical path between the optical path branching device and the light receiving device.

According to this aspect, when the diffraction light is transmitted through the optical functional element, it is possible to provide a predetermined amount of phase difference, for example, between the phase of an ordinary ray (or a normal light beam) and the phase of an extraordinary ray (or an abnormal light beam), on the basis of birefringence. Therefore, the polarization direction of the zero-order light and the polarization direction of the diffraction light can be differentiated by a predetermined angle.

In another aspect of the optical pickup of the present invention, the optical functional element is disposed on an optical path which is a parallel light flux.

According to this aspect, when the diffraction light is transmitted through the optical functional element, it is possible to provide a predetermined amount of phase difference, for example, between the phase of a normal light beam and the phase of an abnormal light beam, on the basis of birefringence. Therefore, the polarization direction of the zero-order light and the polarization direction of the diffraction light can be differentiated by a predetermined angle.

In another aspect of the optical pickup of the present invention, the optical functional element differentiates the phase difference of the polarization of the diffraction light and the phase difference of the polarization of the zero-order light, on the basis of a (small) difference between an incident angle of the diffraction light and an incident angle of the zero-order light with respect to the optical functional element.

According to this aspect, when the diffraction light is transmitted through the optical functional element, it is possible to provide a predetermined amount of phase difference, for example, between the phase of a normal light beam and the phase of an abnormal light beam, on the basis of birefringence. Therefore, the polarization direction of the zero-order light and the polarization direction of the diffraction light can be differentiated by a predetermined angle.

In another aspect of the optical pickup of the present invention, the optical functional element is disposed on an optical path, which is a parallel light flux, between the light source and the optical path branching device.

According to this aspect, the polarization direction of the zero-order light and the polarization direction of the diffraction light can be differentiated while the light intensity of the diffraction light is maintained to be at a relatively high level.

In another aspect of the optical pickup of the present invention, the optical functional element is disposed on an optical path, which is a parallel light flux, between the optical path branching device and the light receiving device.

According to this aspect, an operation of differentiating the polarization direction of the zero-order light and the polarization direction of the diffraction light by the optical functional element, is performed on a parallel light flux on the side relatively close to the light receiving device. Therefore, it is possible to relatively reduce a loss in the amount of light with respect to the zero-order light and a loss in the amount of light with respect to the diffraction light.

In another aspect of the optical pickup of the present invention, the optical functional element differentiates the phase difference of the polarization of the zero-order light and the phase difference of the polarization of the diffraction light, relatively by about 180 degrees.

According to this aspect, the polarization direction of the zero-order light and the polarization direction of the diffraction light can be differentiated by crossing them each other at a right angle.

In another aspect of the optical pickup of the present invention, order of the diffraction light is ±first-order.

According to this aspect, the polarization state of the zero-order light and the polarization state of the ±first-order diffraction light or plus/minus first-order diffraction ray, which are transmitted through the optical functional element, can be differentiated by the optical functional element.

In another aspect of the optical pickup of the present invention, an area of the one or plurality of light receiving devices is smaller than an area of an irradiation area which is irradiated with stray light generated in another recording layer of the plurality of recording layers, if a focal point is on the one recording layer.

According to this aspect, it is possible to relatively reduce the amount of the stray light to be received on the light receiving device and to make the light receiving device receive a relatively large amount of diffraction light And it is possible to achieve the highly accurate tracking control.

In another aspect of the optical pickup of the present invention, the one or plurality of light receiving devices are disposed within an irradiation area which is irradiated with stray light generated in another recording layer of the plurality of recording layers, if a focal point is on the one recording layer.

According to this aspect, it is possible to reduce a space occupied by the light receiving device. Therefore, it is possible to achieve the miniaturization of the optical pickup.

In another aspect of the optical pickup of the present invention, it is provided with a first light receiving device and a second light receiving device, which receive the diffraction light, and a third light receiving device, which receives the zero-order light, as the light receiving devices.

According to this aspect, it is possible to make the light receiving device receive the light, under the condition that the influence of the stray light is effectively reduced and the level of the light intensity is maintained to be higher, for example, in the tracking control based on the three-beam method on the multilayer type information recording medium, to thereby achieve the highly-accurate tracking control.

In another aspect of the optical pickup of the present invention, it is further provided with a controlling device (tracking control/focus control) for controlling the optical system to guide the laser beam to the recording track provided for the one recording layer, on the basis of the zero-order light and the diffraction light.

According to this aspect, it is possible to make the light receiving device receive the light, under the condition that the influence of the stray light is effectively reduced and the level of the light intensity is maintained to be higher, for example, on the multilayer type information recording medium, to thereby achieve the highly-accurate focus control and tracking control.

(Information Equipment)

The above object of the present invention can be also achieved by an information equipment provided with: the optical pickup of the present invention described above (including its various aspects); and a recording/reproducing device for irradiating the optical disc with the laser beam, to thereby record or reproduce the information signal.

According to the information equipment of the present invention, it is possible to record the information signal onto the optical disc or to reproduce the information signal recorded on the optical disc, while receiving the same various benefits as those of the optical pickup of the present invention described above.

These effects and other advantages of the present invention will become more apparent from the embodiments explained below.

As explained above, according to the optical pickup of the present invention, it is provided with the light source, the diffracting device, the optical system, the optical functional element, and the light receiving device. Therefore, it is possible to make the light receiving device receive the light, under the condition that the influence of the stray light is relatively reduced and the level of the light intensity is maintained to be higher, for example, in the tracking control based on the three-beam method on the multilayer type information recording medium, to thereby achieve the highly-accurate tracking control.

Alternatively, according to the information equipment of the present invention, it is provided with the light source, the diffracting device, the optical system, the optical functional element, the light receiving device, and the recording/reproducing device. Therefore, it is possible to make the light receiving device receive the light, under the condition that the influence of the stray light is relatively reduced and the level of the light intensity is maintained to be higher, for example, in the tracking control based on the three-beam method on the multilayer type information recording medium, to thereby achieve the highly-accurate tracking control.

BRIEF DESCRIPTION OF DRAWINGS

FIG. 1 is a block diagram showing the basic structure of an information recording/reproducing apparatus in an embodiment of the information recording apparatus of the present invention and a host computer.

FIG. 2 is a block diagram conceptually showing the more detailed structure of an optical pickup 100 provided for an information recording/reproducing apparatus 300 in the embodiment.

FIG. 3 is a cross sectional view conceptually showing an optical principle of an optical functional element 104 in the embodiment, with a focus on an X-axis direction and a Z-axis direction.

FIG. 4 is a schematic diagram conceptually showing a medium with optical anisotropy, which constitutes the optical functional element 104 in the embodiment.

FIG. 5 are a schematic diagram conceptually showing an optical functional element corresponding to a zero-order light (so-called main beam) in the embodiment (FIG. 5(a)), and a schematic diagram conceptually showing optical functional elements corresponding to ±first-order diffraction lights (so-called sub beams) in the embodiment (FIG. 5(b)).

FIG. 6 is a plan view conceptually showing a relative positional relationship among optical diameters of the zero-order light and the ±first-order diffraction lights irradiated on three light receiving devices in the embodiment.

FIG. 7 is a plan view conceptually showing a relative positional relationship among optical diameters of the zero-order light and the ±first-order diffraction lights irradiated on three light receiving devices in a comparison example.

FIG. 8 is a block diagram conceptually showing the more detailed structure of an optical pickup 100 provided for an information recording/reproducing apparatus 300 in another embodiment.

FIG. 9 is a plan view showing a relative positional relationship between a light receiving device and an optical diameter in a comparison example.

DESCRIPTION OF REFERENCE CODES 10 optical disc
100 optical pickup
101 semiconductor laser
102 diffraction grating
103 etc. collimator lens or condenser lens 104 optical functional element
105 optical path branch element
106 reflection mirror
107 ¼ wave retarder plate or ¼ wavelength plate
110 astigmatism generating lens
PD0 etc. light receiving device
300 information recording/reproducing apparatus
302 signal recording/reproducing device

BEST MODE FOR CARRYING OUT THE INVENTION

Hereinafter, the best mode for carrying out the invention will be explained in each embodiment in order, with reference to the drawings.

(1) Embodiment of Information Recording/reproducing Apparatus

Firstly with reference to FIG. 1, a detailed explanation will be given on the structure and operation of an embodiment of the information recording apparatus of the present invention. In particular, in the embodiment, the information recording apparatus of the present invention is applied to an information recording/reproducing apparatus for an optical disc.

(1-1) Basic Structure

Firstly, with reference to FIG. 1, an explanation will be given on the basic structure of an information recording/reproducing apparatus 300 in an embodiment of the information recording apparatus of the present invention and a host computer 400. FIG. 1 is a block diagram showing the basic structure of the information recording/reproducing apparatus in the embodiment of the information recording apparatus of the present invention and the host computer. Incidentally, the information recording/reproducing apparatus 300 has a function of recording record data onto an optical disc 10 and a function of reproducing the record data recorded on the optical disc 10.

As shown in FIG. 1, the inner structure of the information recording/reproducing apparatus 300 will be explained. The information recording/reproducing apparatus 300 is an apparatus for recording information onto the optical disc 10 and for reading the information recorded on the optical disc 10, under the control of a CPU (Central Processing Unit) 314 for drive.

The information recording/reproducing apparatus 300 is provided with: the optical disc 10; an optical pickup 100; a signal recording/reproducing device 302; an address detection device 303; the CPU (drive control device) 314; a spindle motor 306; a memory 307; a data input/output control device 308; and a bus 309.

Moreover, the host computer 400 is provided with: a CPU (host control device) 401; a memory 402; an operation control device 403; an operation button 404; a display panel 405; a data input/output control device 406; and a bus 407.

In particular, the information recording/reproducing apparatus 300 may be constructed to communicate with an external network by housing the host computer 400 equipped with a communication device, such as a modem, in the same case. Alternatively, the information recording/reproducing apparatus 300 may be constructed to communicate with an external network by that the CPU (host control device) 401 of the host compute 400 equipped with a communication device, such as an i-link, controls the information recording/reproducing apparatus 300 directly through the data input/output control device 308 and the bus 309.

The optical pickup 100 is to perform the recording/reproducing with respect to the optical disc 10, and is provided with a semiconductor laser apparatus and a lens. More specifically, the optical pickup 100 irradiates the optical disc 10 with a light beam, such a laser beam, as reading light with a first power upon reproduction, and as writing light with a second power with it modulated upon recording.

The signal recording/reproducing device 302 performs the recording/reproducing with respect to the optical disc 10 by controlling the optical pickup 100 and the spindle motor 306. More specifically, the signal recording/reproducing device 302 is provided with a laser diode driver (LD driver), a head amplifier, and the like. The LD driver drives the not-illustrated semiconductor laser built in the optical pickup 100. The head amplifier amplifies the output signal of the optical pickup 100, i.e., the reflected light of the laser beam, and outputs the amplified signal. More specifically, the signal recording/reproducing device 302 drives the not-illustrated semiconductor laser built in the optical pickup 100 so as to determine an optimum laser power by the processes of recording and reproducing an OPC pattern, together with a not-illustrated timing generator or the like, under the control of the CPU 314, in an OPC (Optimum Power Control) process. In particular, the signal recording/reproducing device 302 constitutes one example of the "recording/reproducing device" of the present invention, with the optical pickup 100.

The address detector 303 detects an address (address information) on the optical disc 10 from a reproduction signal including e.g. a pre-format address signal or the like, outputted by the signal recording/reproducing device 302.

The CPU (drive control device) 314 controls the entire information recording/reproducing apparatus 300 by giving instructions to various devices, through the buss 309. Incidentally, software or firmware for operating the CPU 314 is stored in the memory 30. In particular, the CPU 314 constitutes one example of the "controlling device" of the present invention.

The spindle motor 306 is to rotate and stop the optical disc 10, and operates in accessing the optical disc 10. More specifically, the spindle motor 306 is constructed to rotate the optical disc 10 at a predetermined speed and stop it, under the spindle servo provided by a not-illustrated servo unit or the like.

The memory 307 is used in the general data processing and the OPC process on information recording/reproducing apparatus 300, including a buffer area for the record/reproduction data, an area used as an intermediate buffer when data is converted into the data that can be used on the signal recording/reproducing device 302, and the like. Moreover, the memory 307 is provided with: a ROM area in which a program for performing an operation as a recording device, i.e., firmware, is stored; a buffer for temporarily storing the record/reproduction data; a RAM area in which a parameter required for the operation of the firmware program or the like is stored; and the like.

The data input/output control device 308 controls the data input/output from the exterior with respect to the information recording/reproducing apparatus 300, and stores the data into or extracts it from a data buffer on the memory 307. A drive control command, which is issued from the external host computer 400 connected to the information recording/reproducing apparatus 300 via an interface, such as a SCSI (Small Computer System Interface) and an ATAPI (AT Attachment Packet Interface), is transmitted to the CPU 314 through the data input/output control device 308. Moreover, the record/reproduction data is also exchanged with the host computer 400 through the data input/output control device 308.

The CPU (host control device) 401, the memory 402, the data input/output control device 406, and the bus 407 of the host computer 400 are substantially the same as the corresponding constituent elements in the information recording/reproducing apparatus 300.

The operation control device 403 performs the reception of the operation instruction and display with respect to the host computer 400. The operation control device 403 sends the instruction to perform the recording or reproduction, using the operation bottom 401, to the CPU 401. The CPU 401 may send a control command to the information recording/reproducing apparatus 300 through the input/output control device 406 on the basis of the instruction information from the operation/display control device 403, to thereby control the entire information recording/reproducing apparatus 300. In the same manner, the CPU 401 can send a command of requiring the information recording/reproducing apparatus 300 to send the operational state to the host, to the information recording/reproducing apparatus 300. By this, it is possible to recognize the operational state of the information recording/reproducing apparatus 300, such as during recording and during reproduction. Thus, the CPU 401 can output the operational state of the information recording/reproducing apparatus 300, to the display panel 405, such as a fluorescent tube and a LCD, through the operation control device 403.

One specific example in which the information recording/reproducing apparatus 300 and the host computer 400, as explained above, are used together is household equipment, such as recorder equipment for recording/reproducing a video. The recorder equipment is equipment for recording a video signal from a broadcast reception tuner and an external connection terminal, onto a disc, and for outputting the video signal reproduced from the disc, to external display equipment, such as a television. The operation as the recorder equipment is performed by executing a program stored in the memory 402, on the CPU 401. Moreover, in another specific example, the information recording/reproducing apparatus 300 is a disc drive (hereinafter referred to as a drive, as occasion demands), and the host computer 400 is a personal computer or a workstation. The host computer 400, such as the personal computer, and the disc drive are connected to each other through the data input/output control devices 308 and 406, such as the SCSI and the ATAPI. An application, such as writing software, which is installed in the host computer, controls the disc drive.

(2) Optical Pickup

Next, with reference to FIG. 2, an explanation will be given on the more detailed structure of the optical pickup 100 provided for the information recording/reproducing apparatus 300 in the embodiment. FIG. 2 is a block diagram conceptually showing the more detailed structure of the optical pickup 100 provided for the information recording/reproducing apparatus 300 in the embodiment.

As shown in FIG. 2, the optical pickup 100 is provided with: a semiconductor laser 101; a diffraction grating 102; a collimator lens or a condenser lens 103; an optical functional element 104; an optical path branch element 105; a reflection mirror 106; ¼ wave retarder plate or a ¼ wavelength plate 107; a objective lens or a condenser lens 108; a collimator lens or a condenser lens 109; an astigmatism generating lens 110; a light receiving device (or photo detector) PD0; a light receiving device (or photo detector) PD1a; and a light receiving device (or photo detector) PD1b. Therefore, a laser beam LB is emitted from the semiconductor laser 101 in the following order and is received by the light receiving device PD0 or the like through each element. That is, if it is guided to one recording layer of the optical disc as a so-called outward on the optical path, the laser beam LB emitted from the semiconductor laser 101 is guided to the one recording layer through the diffraction grating 102, the collimator lens or the condenser lens 103, the optical functional element 104, the optical path branch element 105, the reflection mirror 106, the ¼ wavelength plate 107, and the objective lens or the condenser lens 108. On the other hand, as a so-called homeward on the optical disc, the laser beam LB reflected by the one recording layer is received on the light receiving device PD0 through the objective lens or the condenser lens 108, the ¼ wavelength plate 107, the reflection mirror 106, the optical path branch element 105, the condenser lens 109, and the astigmatism generating lens 110.

In particular, the display of the diffraction light generated on the diffraction grating 102 is omitted on the optical path between the diffraction grating 102 and the condenser lens 108. Moreover, substantially in the same manner, the display of the diffraction light is also omitted on the optical path between the condenser lens 108 and the astigmatism generating lens 110.

Incidentally, the condenser lenses 103, 108, and 109, the optical path branch element 105, the reflection mirror 106, the ¼ wavelength plate 107, and the astigmatism generating lens 110 constitute one specific example of the optical system of the present invention. Moreover, the light receiving devices PD0, PD1a, and PD1b constitute one specific example of the light receiving device of the present invention.

The semiconductor laser 101 emits the laser beam LB in an elliptical light emission pattern which enlarges more in a perpendicular direction than in a horizontal direction, for example.

The diffraction grating 102 diffracts the laser beam emitted from the semiconductor laser 101, to zero-order light (or zero-order ray), + first-order light (or plus first-order ray), and − first-order light (or minus first-order ray).

The condenser lens 103 makes the incident laser beam LB substantially parallel and makes it enter the optical functional element 104.

The optical functional element 104 differentiates the polarization direction of the zero-order light and the polarization directions of the ±first-order lights (or ±first-order rays), which are components of the incident laser beam LB. Incidentally, the optical functional element 104 will be detailed later. Moreover, as one specific example of the optical functional element 104, a phase difference film can be listed. In particular, the phase difference film has wavelength dependence, with respect to the laser beam. Therefore, it is possible to differentiate the polarization direction in appropriate response to the laser beam by using the phase difference film having the optical property corresponding to the wavelength of the laser beam.

The optical path branch element 105 is an optical element for branching the optical path on the basis of the polarization direction, such as a beam splitter. Specifically, the optical path branch element 105 transmits the laser beam LB whose polarization direction is one direction therethrough in such a condition that there is little or no loss of the quantity of light, and reflects the laser beam LB which enters from the optical disc side and whose polarization direction is another direction in such a condition that there is little or no loss of the quantity of light. The reflected light reflected on the optical path branch element 105 is received by the light receiving devices PD0, PD1a, and PD1b, through the condenser lens 109 and the astigmatism generating lens 110.

The reflection mirror reflects the laser beam LB in such a condition that there is little or no loss of the quantity of light.

The ¼ wavelength plate 107 provides the laser beam with a phase difference of 90 degrees, to thereby convert the linearly-polarized laser beam to circularly-polarized light and convert the circularly-polarized laser to the linearly-polarized laser.

The condenser lens 108 focus the incident laser beam LB and irradiates it on the recording surface of the optical disc 10. Specifically, the condenser lens 108 is provided, for example, with an actuator device, and has a driving mechanism for changing the arrangement position of the condenser lens 108. More specifically, the actuator device displaces the position of the condenser lens 108, e.g. the objective lens in a focus direction, to thereby focus a focal point on one recording layer and another recording layer of the optical disc.

The condenser lens 109 focuses the reflected light reflected on the optical path branch element 105.

The light receiving device PD0 receives the zero-order light. The light receiving device PD1a receives the + first-order light. The light receiving device PD1b receives the −first-order light.

(3) Optical Functional Element

Next, with reference to FIG. 3 to FIG. 5, an explanation will be given on the optical principle of the optical functional element 104 in the embodiment. FIG. 3 is a cross sectional view conceptually showing an optical principle of the optical functional element 104 in the embodiment, with a focus on an X-axis direction and a Z-axis direction. FIG. 4 is a schematic diagram conceptually showing a medium (hereinafter referred to as "medium with anisotropy of a refractive index" as occasion demands) with optical anisotropy, which constitutes the optical functional element 104 in the embodiment. FIG. 5 are a schematic diagram conceptually showing an optical functional element corresponding to a zero-order light in the embodiment (FIG. 5(*a*)), and a schematic diagram conceptually showing optical functional elements corresponding to ±first-order diffraction lights in the embodiment (FIG. 5(*b*)). Incidentally, the scale on the line of an arrow in FIG. 5 (and FIG. 10 described later) indicates the length of the optical path per unit time.

As shown in FIG. 3, by virtue of the optical functional element 104 in the embodiment, it is possible to differentiate the polarization direction of the zero-order light and the polarization directions of the ±first-order diffraction lights or plus/minus first-order diffraction lights (i.e. −first-order light in addition to or instead of + first-order light), in which the zero-order light and the ±first-order diffraction lights are transmitted through the optical functional element 104. Specifically, all the polarization direction of the zero-order light and the polarization directions of the ±first-order diffraction lights are first directions (refer to arrows AR0 in FIG. 3: e.g. a parallel direction to a paper surface) before they enter the optical functional element 104. On the other hand, after transmitted through the optical functional element 104, the polarization direction of the zero-order light is the same first direction as before entering. In contrast, after transmitted through the optical functional element 104, the polarization directions of the ±first-order diffraction lights are second directions (refer to arrows AR1 in FIG. 3: e.g. a perpendicular direction to the paper surface) which are different from before entering.

Specifically, the medium with anisotropy of a refractive index or an Index ellipsoid or a refractive index ellipsoidal body of a material which constitutes the optical functional element 104, has the optical property shown in FIG. 4. In general, when the optical property, such as the refractive index of a material, is expressed, it is easy to understand it if considering components (nx, ny, nz) obtained by decomposition based on three orthogonal coordinate axes. As a result of the decomposition of the component, if all the three values based on the three coordinate axes are equal, then it can be said that this material is isotropic. In contrast, as shown in FIG. 4, if the value of the x-axis component and the value of the y-axis component are equal, the incident light coming from the z-axis direction and the incident light coming from a direction deviating from the z-axis direction have different amounts of phase differences of the polarization received or affected by the incident lights.

Therefore, as shown in FIG. 5(*a*), even if the zero-order light is transmitted through the optical functional element 104 from the Z-axis direction, which is the travelling direction of the laser beam, it is the same as being transmitted through the optical functional element 104 having the optically isotropic characteristic. Therefore, after being transmitted through the optical functional element 104, the polarization direction of the zero-order light is the same first direction as before entering (refer to the arrows AR0 in FIG. 3).

In contrast, as shown in FIG. 5(*b*) in addition to FIG. 4, if the ±first-order diffraction lights are transmitted through the optical functional element 104 from a direction which is different from or deviating from the Z-axis direction of the travelling direction of the laser beam, by a small or tiny predetermined angle "θ", they are transmitted through the optical functional element 104 having the optically anisotropic characteristic. Therefore, in the ±first-order diffraction lights, the speed of an ordinary ray or a normal light beam in the optical functional element 104 is different from the speed of an extraordinary ray or an abnormal light beam in the optical functional element 104. Thus, after the ±first-order diffraction lights are transmitted through the optical functional element 104, the phase of the normal light beam and the phase of the abnormal light beam have a phase difference of 180 degrees, for example. As a result, after being transmitted through the optical functional element 104, the polarization directions of the ±first-order diffraction lights are different from before entering and are changed to a 90-degree rotated direction in accordance with the phase difference, for example.

As a result, it is possible to differentiate the polarization direction of the zero-order light and the polarization directions of the ±first-order diffraction lights, for example, by crossing them each other at a right angle. Therefore, on the light receiving device, it is possible to effectively reduce the influence of the light interference between the stray light of the zero-order light and the signal lights of the ±first-order diffraction lights, whose irradiation areas overlap. In particular, since the stray light of the zero-order light and the signal lights of the ±first-order diffraction lights have substantially the same level of the light intensity, it is possible to more significantly reduce the influence of the light interference by the stray light on the light receiving device PD1a (or PD1b) which receives the ±first-order diffraction lights, by differentiating the polarization directions of the stray light of the zero-order light and the signal lights of the ±first-order diffraction lights. In addition, even in the signal light of the zero-order light and the stray lights of the ±first-order diffraction lights, it is possible to reduce the influence of the light interference by the stray light on the light receiving device PD0 which receives the zero-order diffraction lights, by differentiating the polarization directions of the signal light of the zero-order light and the stray lights of the ±first-order diffraction lights.

As a result, it is possible to make the light receiving device receive the light, under the condition that the influence of the stray light is effectively reduced and the level of the light intensity is maintained to be higher, for example, in the tracking control based on the three-beam method on the multilayer type information recording medium, to thereby achieve the highly-accurate tracking control.

(4) Study of Operation and Effect in Embodiment

Next, with reference to FIG. 6 and FIG. 7, an explanation will be given on the operation and effect in the embodiment. FIG. 6 is a plan view conceptually showing a relative positional relationship among optical diameters of the zero-order light and the ±first-order diffraction lights irradiated on three light receiving devices in the embodiment. FIG. 7 is a plan view conceptually showing a relative positional relationship among optical diameters of the zero-order light and the ±first-order diffraction lights irradiated on three light receiving devices in a comparison example. Incidentally, in FIG. 6 and FIG. 7, with regard to the areas with them irradiated with the light, conceptually, there are the following four types of areas. That is, the areas are (i) an area which is irradiated with the signal light of the zero-order light and which has the highest level of the light intensity per unit area (i.e. an area with the maximum level of the light intensity), (ii) an area which is irradiated with the stray light of the zero-order light and which has the second highest level of the light intensity per unit area, (iii) an area which is irradiated with the signal lights of the ±first-order diffraction lights and which has the second highest level of the light intensity per unit area, and (iv) an area which is irradiated with the stray lights of the ±first-order diffraction lights and which has the third highest level of the light intensity per unit area (i.e. an area with the minimum level of the light intensity). Incidentally, the light intensity per unit area in the aforementioned area in (ii) type also depends on optical path designing, such as size of the irradiation area. Thus, although the level of the light intensity in (ii) type and the level of the light intensity in (iii) type are the same "second", they do not necessarily match. Here, note that the expression "second" is used in order to express the relative light intensity level from (i) type to (iv) type.

As shown in an upper part of FIG. 6, it is possible to differentiate the polarization direction of the zero-order light and the polarization directions of the ±first-order diffraction lights, for example, by crossing them each other at a right angle on the optical pickup in the embodiment. In other words, it is possible to provide a relative phase difference in "π" degrees between a phase difference "α" degrees of the polarization of the zero-order light and a phase difference "α+π" degrees of the polarization of the ±first-order diffraction lights. Here, the "phase difference of the polarization" in the embodiment means a phase difference between two linear polarization components in which the polarization state of the laser beam can be defined, such as a linear polarization or elliptic polarization. Specifically, in general, the polarization of the laser beam can be decomposed into the two linear polarization components which oscillate in directions crossing each other at a right angle in a plane perpendicular to the traveling direction of the light. Therefore, the polarization of the laser beam can be broadly classified into linear polarization, elliptic polarization, and circular polarization, on the basis of the amplitude and the phase difference of the two linear polarization components.

In particular, as shown in a central part of FIG. 6, since the stray light of the zero-order light and the signal lights of the ±first-order diffraction lights have substantially the same level of the light intensity, it is possible to more significantly reduce the influence of the light interference by the stray light on the light receiving device PD1a (or PD1b) which receives the ±first-order diffraction lights, as shown in a lower part of FIG. 6, by differentiating the polarization directions of the stray light of the zero-order light and the signal lights of the ±first-order diffraction lights. In addition, even in the signal light of the zero-order light and the stray lights of the ±first-order diffraction lights, it is possible to reduce the influence of the light interference by the stray light on the light receiving device PD0 which receives the zero-order lights, by differentiating the polarization directions of the signal light of the zero-order light and the stray lights of the ±first-order diffraction lights.

If the polarization direction of the zero-order light and the polarization direction of the ±first-order diffraction lights are not differentiated, as shown in a lower part of FIG. 7, since the stray light of the zero-order light and the signal lights of the ±first-order diffraction lights have substantially the same level of the light intensity, the influence of the light interference by the stray light increases on the light receiving device PD1a (or PD1b) which receives the ±first-order diffraction lights, and thus it is hard to properly perform the tracking control.

In contrast, according to the embodiment, it is possible to differentiate the polarization direction of the zero-order light and the polarization directions of the ±first-order diffraction lights, for example, by crossing them each other at a right angle. As a result, it is possible to make the light receiving device receive the light, under the condition that the influence of the stray light is effectively reduced and the level of the light intensity is maintained to be higher, for example, in the tracking control based on the three-beam method on the multilayer type information recording medium, to thereby achieve the highly-accurate tracking control.

(5) Another Embodiment

Next, with reference to FIG. 8, an explanation will be given on the structure of the optical pickup 100 provided for the information recording/reproducing apparatus 300 in another embodiment. Incidentally, substantially the same constituent elements as those in the aforementioned embodiment explained in FIG. 1 to FIG. 7 carry the same numerical reference, and the explanation thereof will be omitted.

In particular, even here, substantially in the same manner as the aforementioned, the display of the diffraction light generated on the diffraction grating 102 is omitted on the optical path between the diffraction grating 102 and the condenser lens 108. Moreover, substantially in the same manner, the display of the diffraction light is also omitted on the optical path between the condenser lens 108 and the astigmatism generating lens 110.

(5-1) Another Embodiment

Firstly, with reference to FIG. 8, an explanation will be given on the detailed structure of the optical pickup 100 provided for the information recording/reproducing apparatus 300 in another embodiment. FIG. 8 is a block diagram conceptually showing the more detailed structure of the optical pickup 100 provided for the information recording/reproducing apparatus 300 in another embodiment.

As shown in FIG. 8, the optical pickup 100 in another embodiment is provided with: an optical functional element 104a instead of the optical functional element 104, on the optical path between the optical path branch element 105 and the light receiving device (or photo detector) PD0 or the like. That is, an operation of differentiating the polarization direction of the zero-order light and the polarization directions of the diffraction lights by the optical functional element 104a, is performed on a parallel light flux between the optical path branch element and the light receiving device. Therefore, it is possible to minimize a loss in the amount of light with respect to the zero-order light and a loss in the amount of light with respect to the diffraction light.

The present invention is not limited to the aforementioned embodiments, but various changes may be made, if desired, without departing from the essence or spirit of the invention which can be read from the claims and the entire specification. An optical pickup and information equipment, all of which involve such changes, are also intended to be within the technical scope of the present invention.

INDUSTRIAL APPLICABILITY

The optical pickup and the information equipment of the present invention can be applied to an optical pickup for irradiating an information recording medium, such as a DVD, with a laser beam when an information signal is recorded or reproduced, and information equipment provided with the optical pickup.

The invention claimed is:

1. An optical pickup for recording or reproducing an information signal with respect to an optical disc comprising a plurality of recording layers, each recording layer having a recording track in which information pits are arranged, the information signal being recorded in the information pits, said optical pickup comprising:
   a light source for irradiating a laser beam;
   a diffracting device for diffracting the irradiated laser beam to zero-order light and diffraction light;
   an optical system for guiding the zero-order light and the diffraction light, which are diffracted, to one recording layer of the plurality of recording layers;
   an optical functional element for differentiating a phase difference of polarization of the zero-order light and a phase difference of polarization of the diffraction light;
   one or a plurality of light receiving devices for receiving at least the diffraction light; and
   an optical path branching device for guiding the zero-order light and the diffraction light coming from the one recording layer, to said light receiving device.

2. The optical pickup according to claim 1, wherein said optical functional element is disposed (i) on an optical path between said light source and said optical path branching device, or (ii) on an optical path between said optical path branching device and said light receiving device.

3. The optical pickup according to claim 1, wherein said optical functional element is disposed on an optical path which is a parallel light flux.

4. The optical pickup according to claim 1, wherein said optical functional element differentiates the phase difference of the polarization of the diffraction light and the phase difference of the polarization of the zero-order light, on the basis of a difference between an incident angle of the diffraction light and an incident angle of the zero-order light with respect to said optical functional element.

5. The optical pickup according to claim 1, wherein said optical functional element is disposed on an optical path, which is a parallel light flux, between said light source and said optical path branching device.

6. The optical pickup according to claim 1, wherein said optical functional element is disposed on an optical path, which is a parallel light flux, between said optical path branching device and said light receiving device.

7. The optical pickup according to claim 1, wherein said optical functional element differentiates the phase difference of the polarization of the zero-order light and the phase difference of the polarization of the diffraction light, relatively by about 180 degrees.

8. The optical pickup according to claim 1, wherein order of the diffraction light is ±first-order.

9. The optical pickup according to claim 1, wherein an area of said one or plurality of light receiving devices is smaller than an area of an irradiation area which is irradiated with stray light generated in another recording layer of the plurality of recording layers, if a focal point is on the one recording layer.

10. The optical pickup according to claim 1, wherein said one or plurality of light receiving devices are disposed within an irradiation area which is irradiated with stray light generated in another recording layer of the plurality of recording layers, if a focal point is on the one recording layer.

11. The optical pickup according to claim 1, comprising a first light receiving device and a second light receiving device, which receive the diffraction light, and a third light receiving device, which receives the zero-order light, as said light receiving devices.

12. The optical pickup according to claim 1, further comprising a controlling device for controlling said optical system to guide the laser beam to the recording track provided for the one recording layer, on the basis of the zero-order light and the diffraction light.

13. An information equipment comprising:
   an optical pickup; and
   a recording/reproducing device for irradiating an optical disc with a laser beam, to thereby record or reproduce an information signal, wherein
   said optical pickup is for recording or reproducing the information signal with respect to the optical disc comprising a plurality of recording layers, each recording layer having a recording track in which information pits are arranged, the information signal being recorded in the information pits, said optical pickup is comprising:
   a light source for irradiating a laser beam;
   a diffracting device for diffracting the irradiated laser beam to zero-order light and diffraction light;
   an optical system for guiding the zero-order light and the diffraction light, which are diffracted, to one recording layer of the plurality of recording layers;
   an optical functional element for differentiating a phase difference of polarization of the zero-order light and a phase difference of polarization of the diffraction light;
   one or a plurality of light receiving devices for receiving at least the diffraction light; and
   an optical path branching device for guiding the zero-order light and the diffraction light coming from the one recording layer, to said light receiving device.

* * * * *